United States Patent [19]
Weisburn

[11] Patent Number: 5,730,288
[45] Date of Patent: Mar. 24, 1998

[54] INSERT FOR VIDEO CASSETTE PACKAGE

[75] Inventor: James T. Weisburn, Massillon, Ohio

[73] Assignee: Alpha Enterprises, Inc., North Canton, Ohio

[21] Appl. No.: 263,033

[22] Filed: Jun. 21, 1994

[51] Int. Cl.[6] ............................................. B65D 85/672
[52] U.S. Cl. ............................ 206/387.1; 206/387.12; 206/814
[58] Field of Search ................... 206/387.1, 387.12, 206/814, 45.14, 557, 558, 559, 560, 561, 562, 563, 564, 565; 229/199; 220/DIG. 13; 383/127, 119, 104

[56] References Cited

U.S. PATENT DOCUMENTS

| | | | |
|---|---|---|---|
| Re. 32,296 | 11/1986 | Wynalda | 206/45.14 |
| 2,459,247 | 1/1949 | Skold | 206/45.14 |
| 2,531,302 | 11/1950 | Schwennicke | 190/127 |
| 2,693,246 | 11/1954 | Marcheck | 383/119 |
| 3,065,845 | 11/1962 | Nichols | 383/119 |
| 3,523,637 | 8/1970 | Stec | 383/119 |
| 3,620,367 | 11/1971 | Stembel | 206/387.1 |
| 4,488,644 | 12/1984 | Wynalda | 206/387 |
| 4,763,790 | 8/1988 | McGeehins | 206/557 |
| 4,972,951 | 11/1990 | Vartanian | 206/518 |
| 4,986,419 | 1/1991 | Collett et al. | 206/387.1 |
| 5,140,945 | 8/1992 | Barnhart et al. | 119/52.2 |

*Primary Examiner*—M. D. Patterson
*Attorney, Agent, or Firm*—Sand & Sebolt

[57] ABSTRACT

A video cassette package insert is formed of a continuous strip of plastic, preferably in an hourglass configuration. The insert has spaced parallel end walls and concavely curved side walls and has a length and width substantially equal to a VHS cassette and is slidably placed within the hollow interior of an outer cardboard display sleeve. The sleeve includes identifying information on its outside surface about a recorded program on a video cassette to be contained therein. The frame walls are inclined to increase the stiffness and to enable a plurality of the inserts to be stacked in a nested relationship for shipment and storage. The sleeve may be wrapped in clear plastic after placement of the insert therein for subsequent display on a rack.

17 Claims, 3 Drawing Sheets

INSERT FOR VIDEO CASSETTE PACKAGE

BACKGROUND OF THE INVENTION

1. Technical Field

The invention relates to video cassettes, and more particularly, to a an insert for video cassette packages for retail display. More particularly, the invention relates to a stiffening insert which is placed within the cardboard sleeve of a video cassette package to facilitate display of the sleeve on the shelf of a retail or video rental outlet.

2. Background Information

In recent years, there has been a proliferation of stores that sell and rent video cassettes. In addition to stores that specialize in video cassettes, various other types of convenience stores, food markets, gas stations and the like, are also selling and renting video cassettes. Video cassettes are expensive and relatively small in size, and are attractive targets for shoplifters. To avoid theft problems and to facilitate the rental of the video cassettes, many stores will keep the video cassettes in a secure location, such as behind the check-out counter, and deliver them only after a customer has selected the particular taped program or movie they wish to buy or rent.

To enable the customer to select a video cassette, many stores place the empty jacket or sleeve that the prerecorded video cassette normally comes in from the manufacturer, on an open display shelf where the customer can pick it up and read the information which is printed thereon about the recorded program. Usually, video cassette sleeves have not only the title of a program or movie on the video cassette, but also pictures of the stars and/or a synopsis of the contents or plot of the movie. Reading the information on the sleeve allows the customer to verify they are interested in viewing the program on the cassette, without the possibility of the cassette being the subject of a theft.

In most stores, once a customer has selected a particular video cassette program in which they are interested, the customer carries the empty sleeve to the check-out counter. A counter person then takes the empty sleeve from the customer, and the customer makes the payment for the purchase or rental, and is then given the video cassette from its secured stored position for subsequent removal from the store. The empty display sleeves are then usually retained in a separate location until the rented cassette is returned, after which the empty display sleeve is then replaced on the rack, indicating that it is again available for sale or rental.

Video cassette sleeves are generally made of lightweight cardboard material. With the cassette removed, the sleeve is very flexible and subject to bending or folding if it is not handled delicately. To assure that the video cassette sleeves placed on the display shelves remain attractive, many stores place an insert, such a piece of expanded rigid polystyrene or styrofoam or even wood in the sleeve. These inserts give the sleeve rigidity so it can be handled normally without bending or folding. To further help keep the sleeves attractive, many stores also place a sheet of clear plastic around the sleeve to form a facsimile package. This plastic sheet minimizes staining and smudging of the material printed on the sleeve by the repeated handling by the customers and sales personnel.

A problem with the making of such facsimile videocassette packages is that the wood or styrofoam must be specially cut or formed to fit in the sleeve, which makes the sleeve insert unduly expensive and relatively heavy, and occupies a considerable amount of space during storage and shipment. Thus, the need exists for a facsimile video cassette package, and in particular for an insert therefor, which is extremely inexpensive and which reduces storage and transportation costs, yet which provides the desired stiffening when placed within the interior of a usual video cassette storage and display sleeve.

SUMMARY OF THE INVENTION

It is an objective of the present invention to provide an insert for a video cassette package, and in particular an insert, which can be mass produced extremely inexpensively, preferably by injection molding or vacuum forming.

It is a further objective of the invention to provide such a video cassette package insert which can be nested with a plurality of similar inserts, thereby enabling a plurality of the inserts to be stored and shipped in a very small package, occupying only a minimum amount of space.

It is still another objective of the invention to provide such an insert which is easily slipped into and removed from the video cassette cardboard sleeve, and which will not interfere with the subsequent wrapping of the sleeve in its clear plastic outer protective covering.

Still another objective of the invention is to provide such a video cassette package insert which requires no assembly for use and/or storage and shipment, yet which provides sufficient stiffening to the cassette package sleeve, without materially affecting the weight thereof.

These objectives and advantages are obtained by the improved facsimile video cassette package of the present invention, the general nature of which may be stated as including an outer flexible sleeve having printed indicia thereon identifying information concerning a prerecorded program, said sleeve having an open internal cavity with a predetermined transverse width, a longitudinal length, and a height; an insert positioned within said cavity and substantially conforming in size thereto, said insert being formed by a strip of flexible material having a width substantially equal to the height of the cavity and formed into a frame having at least one of its longitudinal or lateral dimensions substantially equal to the corresponding longitudinal length or transverse width of the cavity.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
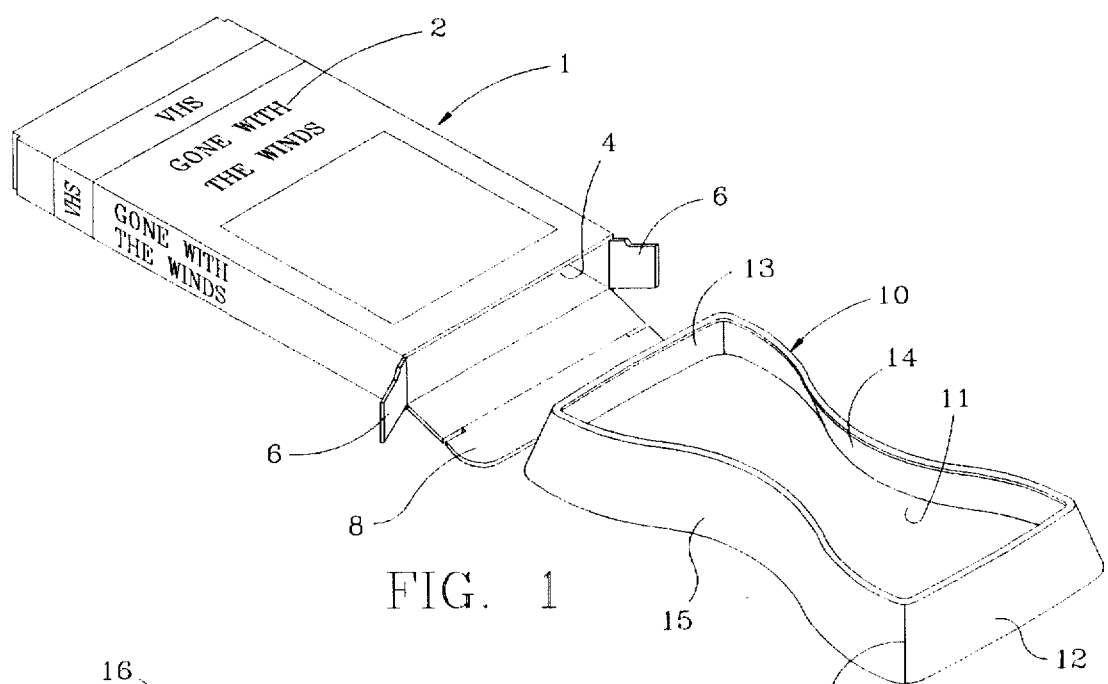
FIG. 1 is a perspective view showing the video cassette package insert of the present invention prior to insertion into a usual video cassette display sleeve.
Figure 2:
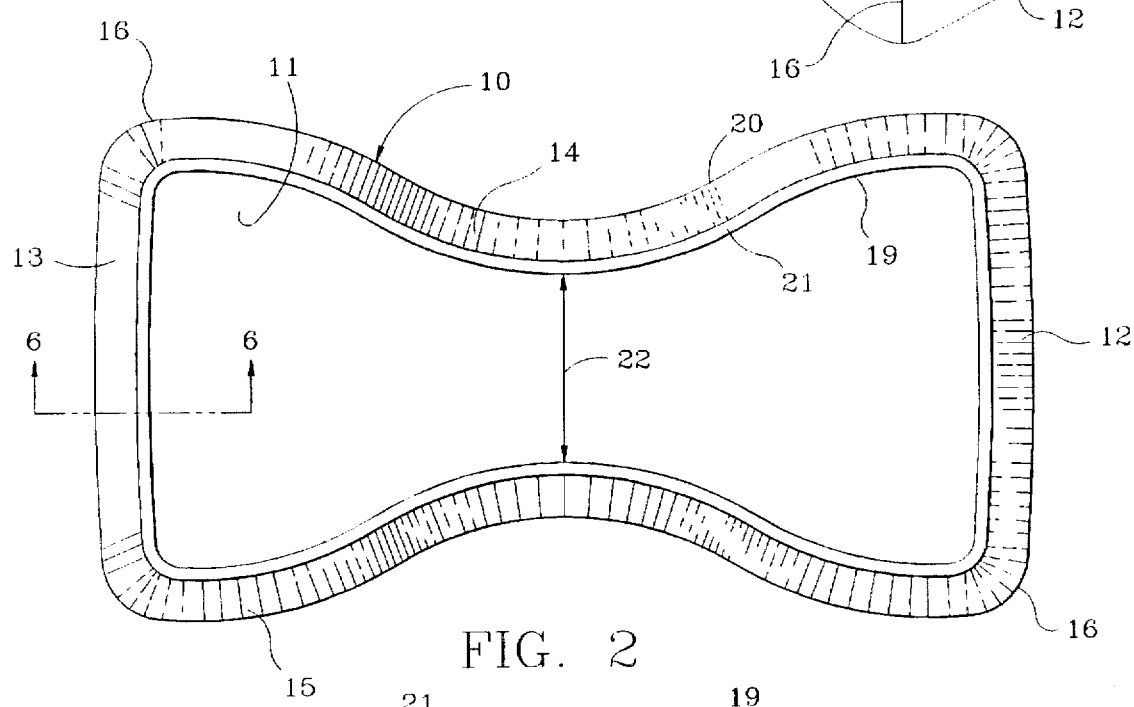
FIG. 2 is an enlarged top plan view of the package insert.

Referring to FIG. 1 of the drawings, there is shown therein a video cassette storage sleeve 1, which is of the type conventionally used to house a prerecorded video cassette, and is usually made of cardboard or similar material. The sleeve has on its outer surface identifying information indicated at 2, which includes items such as the title of the movie or other program recorded on a cassette to be stored therein. This information may also include such items as graphics and the names of the performers. The identifying information is typically highly stylized and visual to catch the attention of the consumer.

Sleeve 1 has an open internal cavity 4 sized for accepting a usual VHS video cassette. Cavity 4 is generally rectangular in both lateral and longitudinal cross section and preferably incorporates end closure tabs 6 and a flap 8 at each longitudinal end.

In accordance with the invention, an improved insert 10 is adapted to be inserted into cavity 4 for subsequent display of the sleeve on a display shelf in a retail store. With insert 10 inside sleeve 1, the assembly is considerably more bend and fold resistant than if sleeve 1 were used alone. In many applications, the assembly of sleeve 1 and insert 10 is covered by a sheet of clear "shrink-wrap" plastic (not shown). This creates a facsimile video cassette package that looks identical to the package used for actual prerecorded video cassettes. The plastic wrap also avoids the buildup of dirt and smudging of the identifying information on the sleeve, which would tend to detract from the appearance of the package when on display.

Insert 10 is a strip of material providing a continuous frame, as shown in FIGS. 1–5, which forms a hollow interior 11. Preferably, insert 10 is formed of a plastic material such as polystyrene or polypropylene, and is formed either by injection molding or vacuum forming, which enables it to be mass produced at an extremely low cost per insert. Insert 10 includes generally spaced parallel end walls 12 and 13, and side walls 14 and 15, which are concavely shaped to provide a general hourglass configuration to insert 10. The height of the walls 12–15 which form the frame is substantially equal to the thickness of a VHS cassette, which is correspondingly equal to the height of cavity 4 formed within storage sleeve 1. Preferably, the end and side walls merge together in rounded corners 16 which increases the rigidity of the insert. The overall length and width of insert 10 is equal to the overall length and width of a VHS cassette, and correspondingly, of the longitudinal and lateral dimensions of cavity 4, so that when it is received therein, it extends substantially throughout the length and width of cavity 4.

Figure 3:
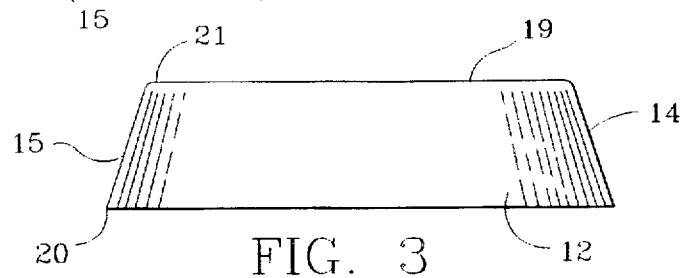
FIG. 3 is an end elevational view of the insert of FIG. 1.
Figure 4:
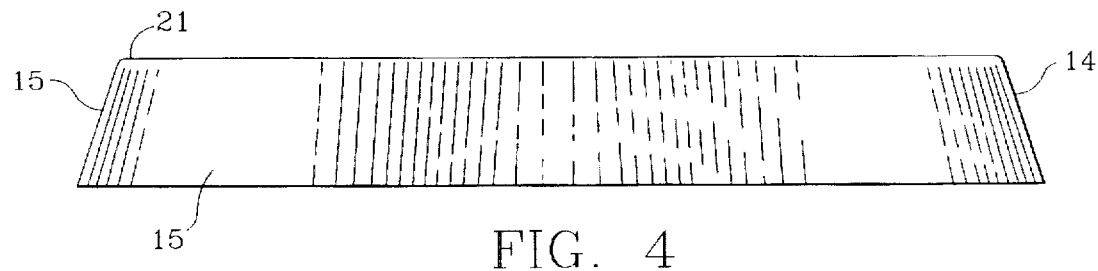
FIG. 4 is a side elevational view of the insert of FIGS. 2 and 3.
Figure 5:
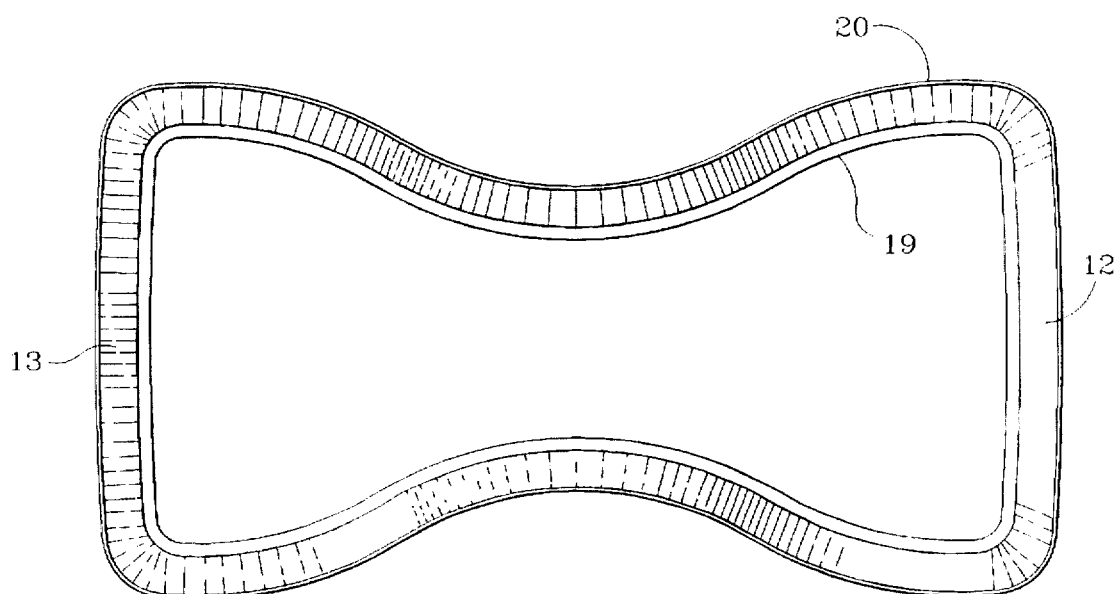
FIG. 5 is a bottom plan view of the insert.
Figure 6:
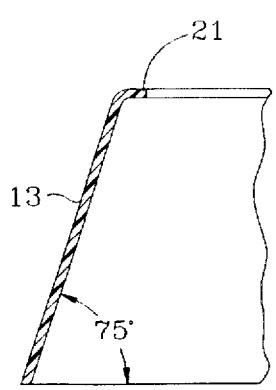
FIG. 6 is an enlarged fragmentary sectional view taken on line 6—6, FIG. 2.
Figure 7:
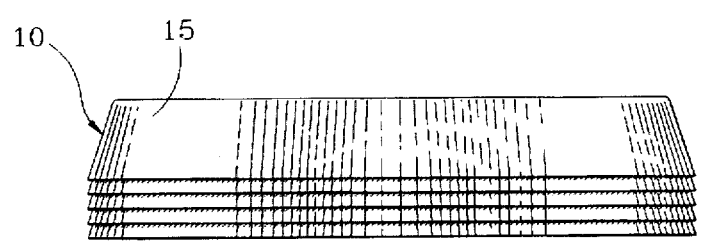
FIG. 7 is a reduced side elevational view showing a plurality of the inserts in a stacked condition.

In accordance with another feature of the invention, the side and end walls of insert 10 are angled, as shown in FIGS. 3 and 6, preferably forming an included angle of approximately 75°. Walls 12–15 define spaced peripheral top and bottom edges 19 and 20, respectively, with top edge 19 being smaller than bottom edge 20. This angulation of the frame walls enables the inserts to be placed in a stacked nested relationship, as shown in FIG. 7, with peripheral edge 19 extending into and beyond peripheral edge 20 of the next adjacent insert. This facilitates the storage and shipment of the inserts, and reduces considerably the transportation and storage costs thereof, in contrast to the prior inserts which are formed of solid blocks of styrofoam or wood. Likewise, insert 10 requires no assembly as do other types of cardboard inserts which must be folded into their final configuration before placement in sleeve 1. Insert 10 is slipped easily into the open end of sleeve 1, as shown in FIG. 1, after which the sleeve is closed by tabs 6 and flap 8. Sleeve 1 then may be followed by the application of the plastic outer wrapping thereon, although the same is not necessary and may not be utilized by certain retail establishments.

In the preferred embodiment, the separation between the two innermost points of concavities, indicated at 22 (FIG. 2), of side walls 14 and 15, is approximately one-half of the length of end walls 12 and 13. Preferably, top peripheral edge 19 is formed with an inwardly extending bead or lip 21 thereon (FIG. 6), which increases the rigidity of insert 10 without materially adding to its cost of production and weight.

The preferred thickness of the frame walls is approximately 0.04 inches. This thickness provides a semi-flexible characteristic to insert 1. However, its overall rectangular configuration imparts sufficient rigidity thereto that when placed within sleeve 1, and will enable the sleeve to withstand normal handling by customers and sales clerks without bending or creasing. The hourglass configuration of concave side walls 14 and 15 provides increased rigidity to the insert than that provided if side walls 14 and 15 were straight forming a true rectangle. Also, the concave side walls provide support for the center area of sleeve 1 during the shrink wrapping thereof and during normal handling by customers. The angled wall configuration increases the rigidity of insert 1 in addition to permitting the stacking of a plurality of such inserts for storage and shipment. All of the above features and advantages are obtained with a minimum amount of plastic material with almost no weight increase to the display package.

Figure 8:
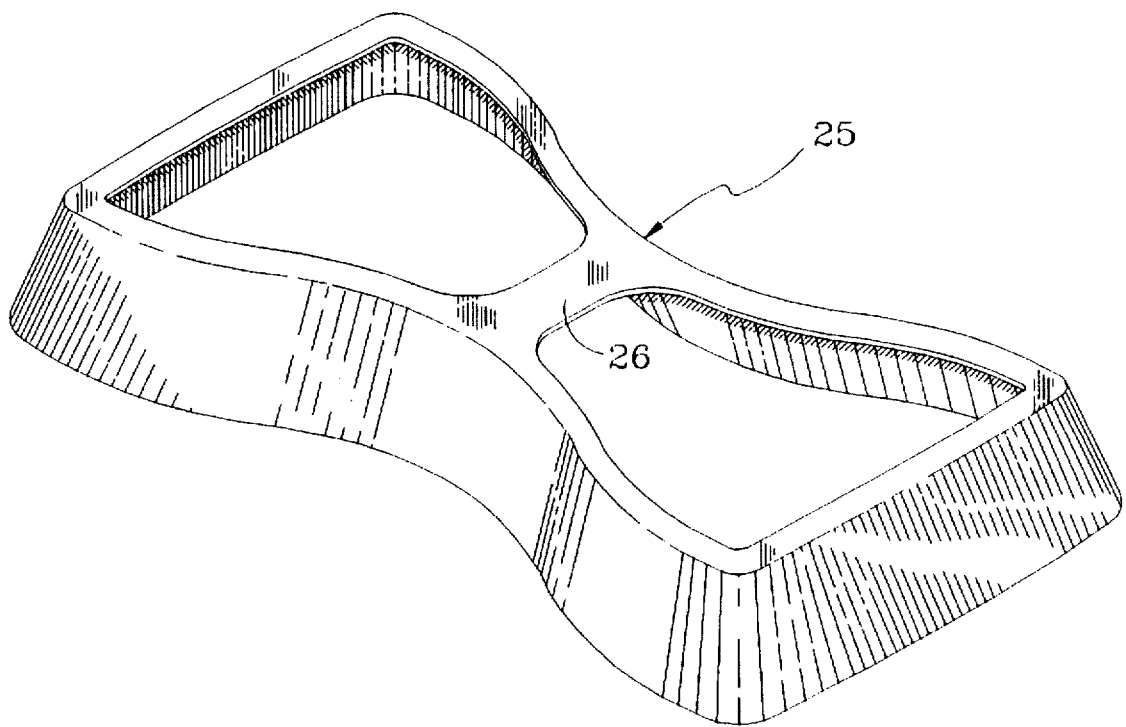
FIG. 8 is a perspective view similar to FIG. 1 showing a modified embodiment of the cassette package insert.

A modified form of the improved insert is indicated generally at 25 and is shown in FIG. 8. Insert 25 is similar in nearly all respects to insert 10 described previously except that a tie bar 26 is formed integrally with the top peripheral edge of the side walls at the innermost point of concavities and extends thereacross. Tie bar 26 has a thickness of approximately 0.050 inches and may have a width of approximately ½ inch. Tie bar 26 merely provides additional reinforcement and stiffening to insert 25 without materially increasing its cost or weight. The nestability and use of insert 25 is the same as that of insert 10 described previously.

Accordingly, the video cassette package insert is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved video cassette package insert is constructed and used, the characteristics of the construction, and the advantageous, new and useful results obtained; the new and useful structures, devices, elements, arrangements, parts and combinations, are set forth in the appended claims.

I claim:

1. A facsimile video cassette package including:
   an outer flexible sleeve having printed indicia thereon, said sleeve having an open internal cavity with a transverse width, a longitudinal length, and a height; and
   an insert positioned within the cavity of the sleeve and substantially conforming in size thereto, said insert being formed by a strip of flexible material having a width substantially equal to the height of the cavity and formed into a frame having a substantially hourglass configuration formed by a pair of spaced end walls and a connecting pair of concavely curved side walls.

2. The cassette package defined in claim 1 in which the outer sleeve is formed with an open end for inserting and removing the insert into and out of the internal cavity.

3. The cassette package defined in claim 2 in which the sleeve includes a closure flap for closing the open end of the sleeve to retain the insert therein.

4. The cassette package defined in claim 1 in which the frame end walls and side walls are integrally merged into each other at rounded corners.

5. The cassette package defined in claim 1 in which the end walls are substantially straight and are parallel to each other.

6. The cassette package defined in claim 1 in which the end and side walls terminate in an inturned reinforcing edge lip.

7. The cassette package defined in claim 1 in which the strip of material is continuous and the end walls and side walls are inclined whereby the frame has first and second peripheral edges so that the first peripheral edge of one frame may be inserted within the second peripheral edge of another frame to enable a plurality of said frames to be stacked in a nested relationship.

8. The cassette package defined in claim 1 in which the frame is an integral one-piece member formed of injection molded plastic.

9. The cassette package defined in claim 1 in which the frame is an integral one-piece member of a vacuum-formed plastic.

10. A one-piece insert to be used in a video cassette display package for stiffening said package includes a continuous peripheral frame formed of plastic defining a hollow interior and formed in an hourglass configuration, said frame having spaced inclined end walls and concavely curved inclined side walls terminating in spaced peripheral edges, one of said peripheral edges being larger than the other of said edges, with said larger peripheral edge forming a continuous opening communicating with the hollow interior to enable a plurality of said frames to be stacked in a nested relationship by inserting the smaller peripheral edge through the opening and into the hollow interior.

11. The insert defined in claim 10 in which the side and end walls merge together at rounded corners.

12. The insert defined in claim 10 in which the maximum points of concavity of the side walls are spaced from each other a distance of approximately one-half the length of the end walls.

13. The insert defined in claim 10 in which the side and end walls are inclined at an angle of approximately 75°.

14. The insert defined in claim 10 in which the frame walls have a thickness of approximately 0.040 inches.

15. The insert defined in claim 11 in which the frame is formed of a polypropylene plastic.

16. The insert defined in claim 10 in which a tie bar is formed integrally with and extends between the concavely curved side walls generally at the midpoint thereof.

17. The insert defined in claim 10 in which the frame is formed of a polystyrene plastic.

* * * * *